United States Patent
Suzuki

(10) Patent No.: US 6,240,063 B1
(45) Date of Patent: May 29, 2001

(54) 3-STAGED TIME-DIVISION SWITCH CONTROL SYSTEM

(75) Inventor: Kazuya Suzuki, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/137,930

(22) Filed: Aug. 21, 1998

(30) Foreign Application Priority Data

Aug. 26, 1997 (JP) .................................................. 9-244641

(51) Int. Cl.[7] .......................... G01R 31/08; H04Q 11/00; H04L 12/50
(52) U.S. Cl. ............................ 370/217; 370/370; 370/373
(58) Field of Search .................................... 370/241, 242, 370/250, 248, 229, 230, 231, 216, 225, 370, 373, 369, 375, 386, 388, 371; 340/825.06, 825.16, 825.79

(56) References Cited

U.S. PATENT DOCUMENTS

| | | | |
|---|---|---|---|
| 3,912,873 | * 10/1975 | Skaperda | 179/18 FC |
| 4,228,535 | * 10/1980 | Workman et al. | 370/16 |
| 4,701,907 | * 10/1987 | Collins | 370/63 |
| 4,797,589 | * 1/1989 | Collins | 370/63 |
| 5,544,152 | * 8/1996 | Obermanns et al. | 370/16 |
| 5,940,375 | * 8/1999 | Soumiya et al. | 370/249 |

FOREIGN PATENT DOCUMENTS

| | | |
|---|---|---|
| 58-71790 | 4/1983 | (JP) . |
| 63-50293 | 3/1988 | (JP) . |
| 2-2800 | 1/1990 | (JP) . |
| 6-46136 | 2/1994 | (JP) . |
| 8-223613 | 8/1996 | (JP) . |

* cited by examiner

Primary Examiner—Alphus H. Hsu
Assistant Examiner—Duc Ho
(74) Attorney, Agent, or Firm—McGuireWoods LLP

(57) ABSTRACT

A T-S-T 3-staged structure switching network control system in a digital switching system which avoids an entire switching system malfunction even a failure occurred in a space switch module, and guarantees a connection within a time switch module is realized for providing the switching system capable of improving its reliability. In each time switch module including a first stage time switch and a third stage time switch with their control processor, a selecting circuit is provided in front of an input of the third time switch for selectively connecting a junctor highway which is connected to an output of a second stage space switch in a space switch module or a highway which is connected to an input of the first stage time switch to the input of said third time switch. The control processor in each time switch module controls the selecting circuit to connect the highway to the input of the third stage time switch in the case that the space switch module is a faulty condition.

10 Claims, 6 Drawing Sheets

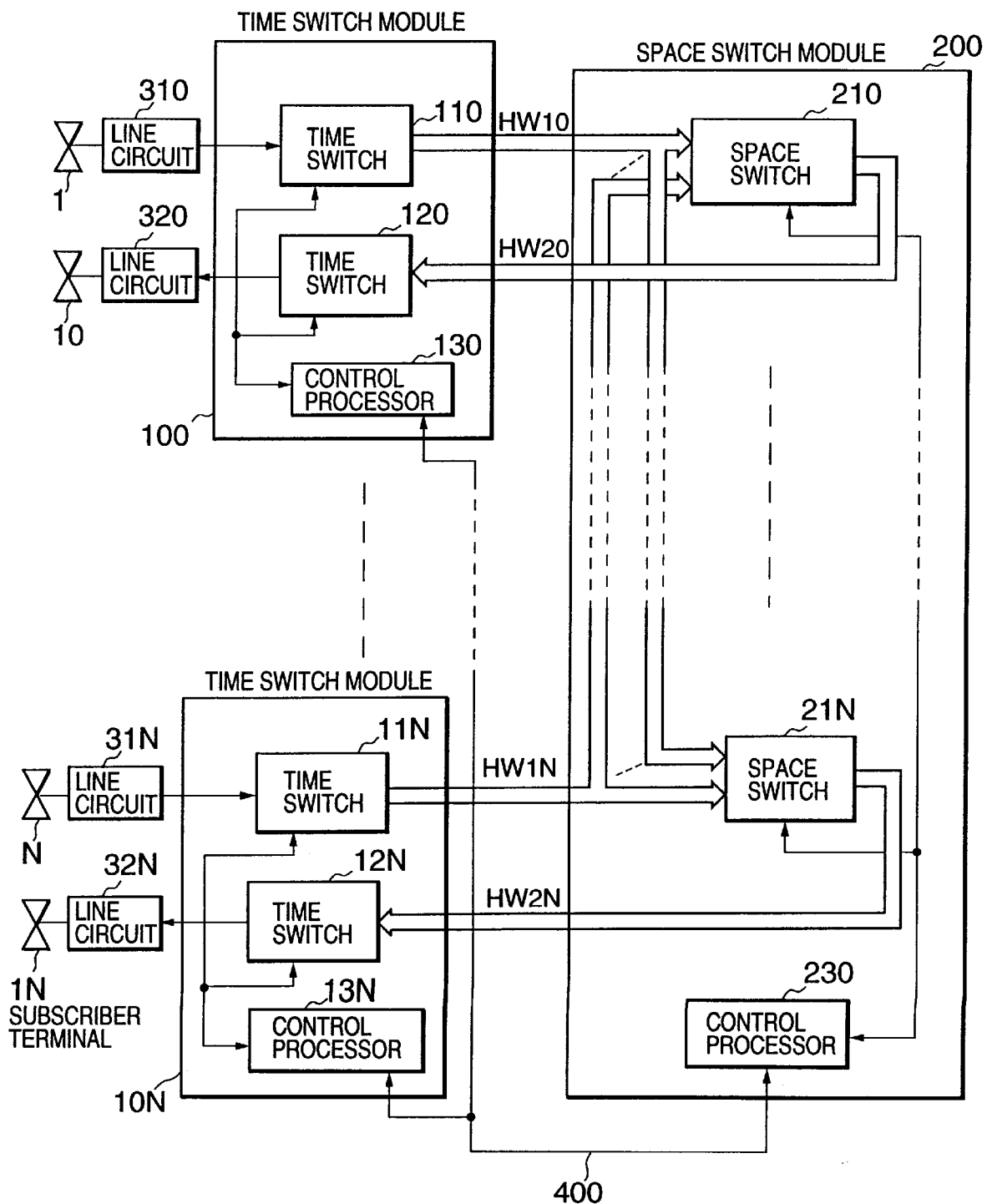

3-STAGED TIME-DIVISION SWITCH CONTROL SYSTEM

BACKGROUND OF THE INVENTION

1. Field of the Invention

The present invention relates to a time-division switch control system of a digital switching system, and more specifically, to a switch control system for a T-S-T (time switch-space switch-time switch) 3-staged structure switching network controlled by a plurality of control processors (a multi-processor type digital switching system.)

2. Description of the Related Art

In the digital switching system, data to be switched is flowed into the switching network in the form of series of time slots through an incoming highway, and necessary switching operation for each time slot is performed and output from the switching network through an outgoing highway.

FIG. 5 is a block diagram illustrating the principle of time slot switching by a T-S-T 3-staged structure switching network which can provides a large capacity switching network. The incoming highway from a line circuit 310–31N is coupled to a first stage time switch 110–11N, and junctor highways HW10–HW1N from each of first stage time switches 110–11N are coupled to a second stage space switch 200. Each of junctor highways HW20–HW2N from the second stage space switch 200 are coupled to each of third stage time switches 120–12N respectively. The outgoing highway from a third stage time switch 120–12N is coupled to a line circuit 320–32N. Each line circuit is coupled to a subscriber terminal 1–N, or 10–1N.

Under these configurations, the principle of switching is like this; the time switch exchanges data in a certain time slot number to a different time slot number, and the space switch exchanges data in a certain time slot number of a certain junctor highway number to a same time slot number of a different junctor highway number.

For more detail, operation performed by the T-S-T 3-staged structure switching network will be explained with reference to FIG. 5.

It is assumed that a communication path is to be established between a subscriber terminal 1 connected to the line circuit 310 and a subscriber terminal 1L connected to the line circuit 32L.

In the digital switching system, a time slot number of the originating subscriber (subscriber terminal 1) on the incoming highway is known as the originating subscriber accommodated position which has informed by a peripheral unit of the digital switching system at the time of call origination request by the subscriber terminal 1, and the time slot number on the incoming highway is assumed as No. k. And also, a time slot number of the terminating subscriber (subscriber terminal 1L) on the outgoing highway and the junctor highway number corresponding to the outgoing highway are known as the result of analysis of the dialled number by the subscriber terminal 1, and the time slot number on the outgoing highway is assumed as No. 1 and the corresponding junctor highway number is assumed as No. HW2L. Therefore, switching is to be performed by exchanging data in the time slot number k on the incoming highway corresponding to the junctor highway HW10 to the time slot number 2 on the outgoing highway corresponding to junctor highway HW2L.

The digital switching system searches a time slot number which is idle state on both junctor highways HW10 and HW2L, and it is assumed that time slot number 2 is available for both junctor highways and the time slot number 2 is reserved for communication path establishment.

After that, the digital switching system instructs the first stage time switch 110 to exchange data in the time slot number k on the incoming highway from the subscriber terminal 1 to the time slot number 2 on the junctor highway HW10, instructs the second stage space switch 200 to exchange data in the time slot number 2 from the junctor highway HW10 to the junctor highway HW2L, and also instructs the third stage time switch 12L to exchange data in the time slot number 2 on the junctor highway HW2L to the time slot number 1 on the outgoing highway to the subscriber terminal 1L.

The T-S-T 3-staged structure switching network of a conventional multi-processor type digital switching system employs such a configuration, as shown in FIG. 6, that the first stage time switch 110 and the third stage time switch 120 are equipped in a one time switch module 100 together with a control processor 130 for controlling those time switches, and a plurality of time switch modules 100–10N are provided depending on number of subscriber terminals 1–N, 10–1N and junction circuits (not shown) to/from other switching systems which are accommodated in this digital switching system, and also a plurality of second stage space switches 210–21N are equipped in a space switch module 200 together with a control processor 230 for controlling those space switches. That is, a plurality of control processors 130–13N, 230 are installed in a distributed manner in each time switch module 100–10N or a space switch module 200 respectively.

Each first stage time switch 110–11N is connected to all of second stage space switches 210–21N by a respective junctor highway HW10–HW1N, and each second space switch 210–21N is connected each third stage time switch 120–12N respectively by a junctor highway HW20–HW2N. Control processors 130–13N, 230 are connected each other by a processor bus 400.

A communication path establishment from a subscriber terminal 1 accommodated in the line circuit 310 connected to the time switch module 100 to a subscriber terminal 1N accommodated in the line circuit 32N connected to the time switch module 10N will now be considered.

In this communication path establishment, such a connection is required from the first stage time switch 110 via the junctor highway HW10, the second stage space switch 21N, and the junctor highway HW2N to the third stage time switch 12N. First, the control processor 130 makes an inquiry about an idle time slot number available on both junctor highways HW10 and HW2N to the control processor 230 in the space switch module 200. The control processor 230 searches an idle time slot available on both junctor highways HW10 and HW1N, and then selects one of available time slot number. The control processor 230, which has found an idle time slot, reserves this idle time slot and notifies this information to the control processor 130. The control processor 130 instructs the time switch 110 to perform a time slot exchange operation from an incoming time slot to the time slot which has been informed by the control processor 230, also, the control processor 130 instructs the control processor 230 and the control processor 13N to perform path establishment in the space switch 21N and in the time switch 12N respectively. In the space switch 21N, the time slot which has been reserved on the junctor highway HW10 is switched to the same time slot on the junctor highway HW2N, and also, in the time switch 12N, a time slot exchange operation from the time slot on the junctor highway HW2N, informed by the control processor 130, to the time slot on the outgoing highway corresponding to the subscriber terminal 1N is performed.

As a result, the switching operation of the communication path from the subscriber terminal 1 to the subscriber terminal 1N has been completed.

In Japanese Patent Application Laid-Open No. sho. 63-50293, similar T-S-T structure switching network model of combining time switches and a space switch is described. In this publication, a configuration of a distributed switching network system which is constituted by coupling a plurality of switch modules, each switch module includes time switches and space switch, is proposed for improving independent characteristics of the control processor in respective switch modules, and it is proposed that highway from other switch module is connected to the space switch via the additional time switch. That is, the proposed configuration, which is a T-(T-S)-T structure switching network, can eliminate common management of busy/idle information on junctor highways to/from each space switch, and can perform switching operation by using own busy/idle information. It means that the control processor in each switch module can operate more independently, and can realize more independent distributed control system.

However, there is a problem, in the above-described conventional T-S-T structure switching network, that all of the connections within the switching network cannot be performed in the case that any one of the second stage space switches or the control processor in the space switch module fails, even when the time switch module including the first stage time switch and the third stage time switch is operated under normal condition. This is because that the means for connecting between the first stage time switch and the third stage time switch is interrupted.

SUMMARY OF THE INVENTION

The present invention has been made to solve the above-described problem, and therefore, has an object to provide a T-S-T 3-staged structure switching network control system in a digital switching system, capable of improving reliability of the switching system. The present invention realizes a T-S-T 3-staged structure switching network control system which avoids an entire switching system malfunction even when a failure occurred in a space switch module, and guarantees a connection within a time switch module.

To achieve the above-described object, a control system of a 3-staged time-division switch, according to the present invention, is constituted by a space switch module including a plurality of second stage space switches and a plurality of time switch modules, each including a first stage time switch connected to an input of one of the second stage space switches by a junctor highway and a third stage time switch connected to an output of the second stage space switch by another junctor highway, for forming a T-S-T (time switch-space switch-time switch) 3-staged structure switching network, and a control means is provided in each time switch module for connecting a highway which is connected to an input of the first stage time switch, instead of the junctor highway from the output of the second stage space switch, to the input of the third time switch for constituting a one-staged time switch switching network when it is detected that the space switch module is a faulty condition.

The control means also connects the highway to the input of the third time switch for constituting a one-staged time switch switching network when it is detected that a junctor highway coupling between the first stage time switch and the second stage space switch is a faulty condition.

The control means selectively connects the junctor highway from the output of the second stage space switch or the highway coupled with the input of the first stage time switch to the input of the third time switch in accordance with a state of the space switch module and a state of the junctor highway between the first time switch and the second space switch, and it constitutes a one-staged time switch switching network by connecting the highway to the input of the third stage time switch when either of the space switch module or the junctor highway between the first time switch and the second space switch is a faulty condition.

The control means is constituted by a selecting circuit provided in front of the input of the third time switch for selectively connecting the junctor highway from the output of the second stage space switch or the highway coupled with the input of the first stage time switch to the input of the third time switch, and a control processor for controlling the selecting circuit to connect the highway to the input of the third stage time switch when either of the space switch module or the junctor highway between the first time switch and the second space switch is a faulty condition.

A supervisory circuit for supervising a state of the junctor highway coupling between the first stage time switch and the second stage space switch is also provided in the space switch module, and a control processor in the space switch module detects a state of the junctor highway through the supervisory circuit. The control processor in the space switch module distributes information about the state of the junctor highway through a processor bus which is connected to all control processors in the time switch modules. Therefore, the control processor in the time switch module controls the selecting circuit to connect the highway to the input of the third stage time switch when a faulty condition of the junctor highway is informed.

The control processors in each time switch module maintains the T-S-T 3-staged structure switching network unless otherwise the junctor highway under faulty condition is connected to own time switch module.

A supervisory circuit for supervising a state of the junctor highway between the selecting circuit and the second stage space switch is also provided in each time switch module. The control processor in the time switch module controls the selecting circuit to connect the highway coupled with the input of the first stage time switch to the input of the third stage time switch for intra time switch module calls when a faulty condition of the junctor highway is found, and distributes this faulty information to other control processors in other time switch modules through the processor bus.

BRIEF DESCRIPTION OF THE DRAWINGS

FIG. 6 is a block diagram illustrating a configuration of the conventional T-S-T 3-staged structure switching network.

DETAILED DESCRIPTION OF PREFERRED EMBODIMENTS

Figure 1:
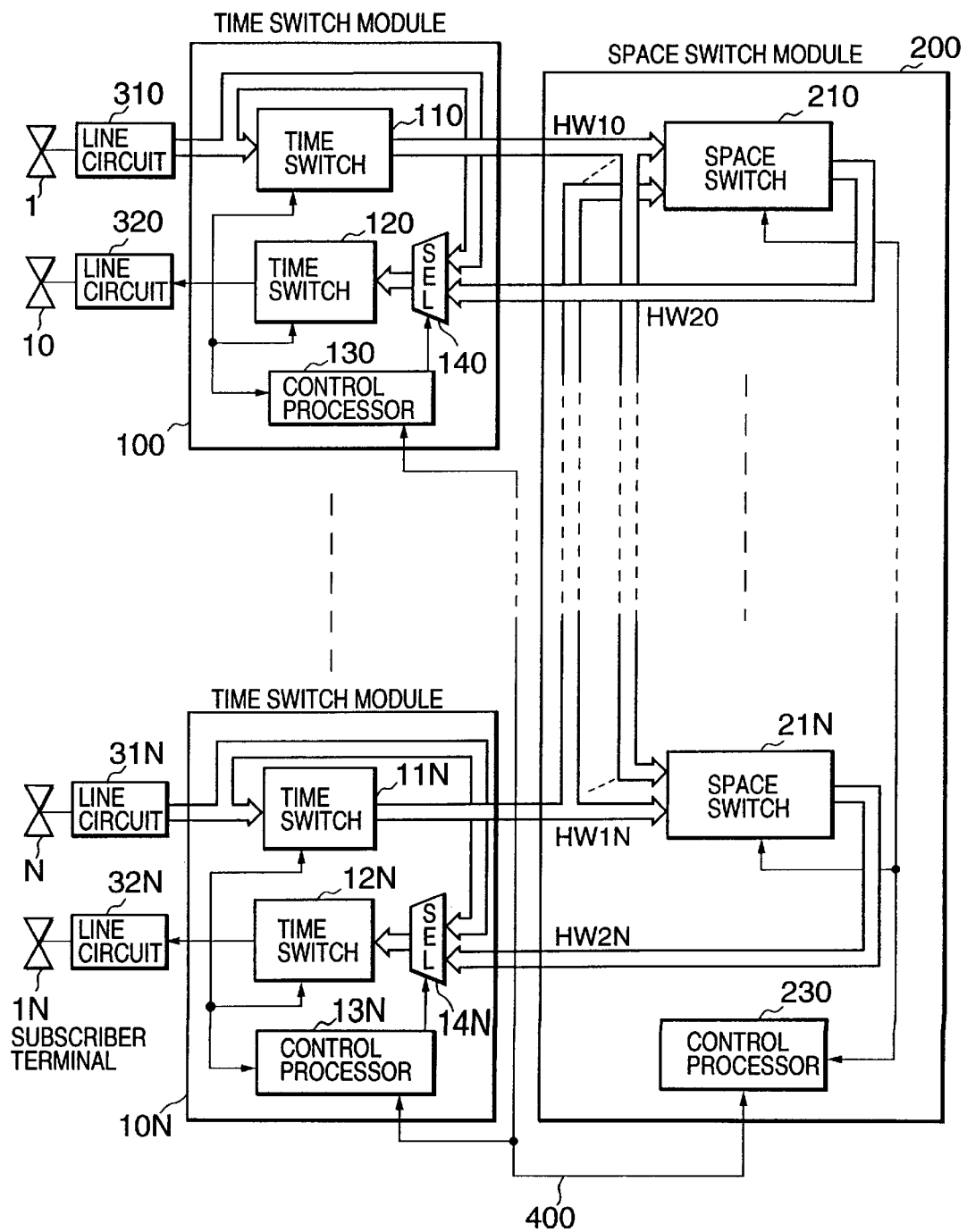
FIG. 1 is a block diagram illustrating a configuration of a first embodiment of the present invention.

FIG. 1 is a block diagram illustrating a configuration of a first embodiment of the present invention.

The incoming highway from a line circuit 310–31N is coupled to a first stage time switch 110–11N and also coupled to a selecting circuit 140–14N which will be described later, and junctor highways HW10–HW1N from each of first stage time switches 110–11N are coupled to a second stage space switch 200. Each of junctor highways HW20–HW2N from the second stage space switch 200 are coupled to each of selecting circuits 140–14N respectively. An output of the selecting circuit 140–14N is coupled to the third stage time switch 120–12N. The outgoing highway from a third stage time switch 120–12N is coupled to a line circuit 320–32N. Each line circuit is coupled to a subscriber terminal 1–N, or 10–1N. That is, the selecting circuit 140–14N inputs data flow on the highway from the line circuit 310–31N and data flow on the junctor highway HW20–HW2N from the space switch 210–21N, and selects one of data flows and outputs to the third stage time switch 120–12N under control of a control processor 130–13N in the same time switch module 100–10N. Control processors 130–13N, 230 are connected each other by a processor bus 400.

When the T-S-T 3-staged structure switching network is a normal condition, the selecting circuit 140–14N selects data flow on the junctor highway HW20–HW2N as the input of the third stage time switch 120–12N. However, when there is a failure in the space switch module 200, the selecting circuit 140–14N selects data flow on the highway from the line circuit 310–31N as the input of the third stage time switch 120–12N. This means that the switching network operates as a T one-staged switching network instead of a T-S-T 3-staged switching network when a failure happens in the space switch module 200. Calls among the same time switch module (e.g. a call between the subscriber terminals 1 and 10 in the time switch module 100) is relieved even a failure occurred in the space switch module, and this arrangement can improve the reliability of the switching system.

Figure 3:
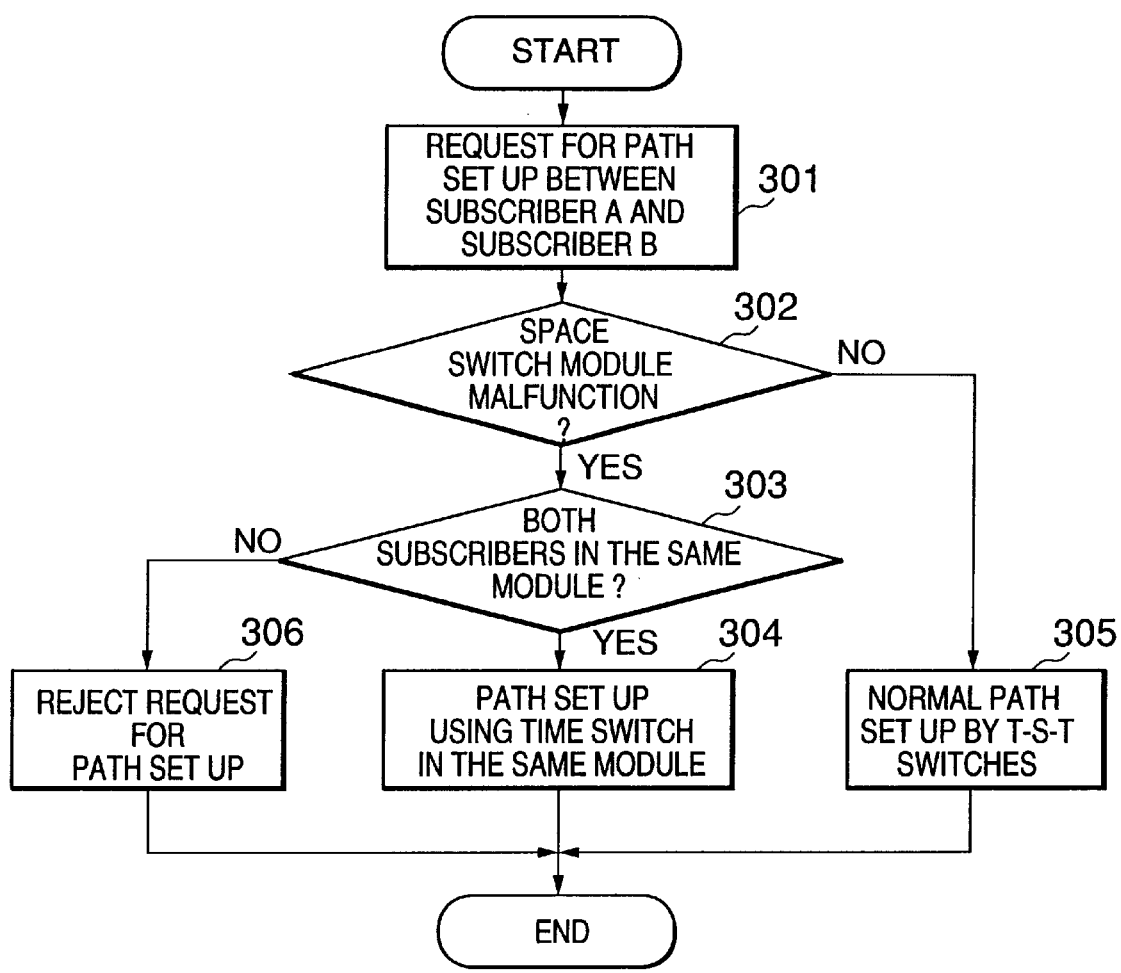
FIG. 3 is a flow chart explaining an operation of the first embodiment of the present invention.

More detail operation of the present invention will be described with reference to the flow chart shown in FIG. 3 together with a block diagram shown in FIG. 1.

It is assumed that the subscriber terminal 1 accommodated in the line circuit 310 connected to the time switch module 100 originates a call.

In this case, the control processor 130 detects the call origination from the subscriber terminal 1 and performs necessary control operation for the call, such as an analysis of dialled number for discriminating destination of the call (step 301). After the destination has been discriminated, the control processor 130 confirms if the space switch module is a normal state (step 302).

When it is confirmed that the space switch module is a normal state (step 302: no), a normal path connection operation is performed (step 305) in the same manner as described for FIG. 6.

That is, if the destination of this call is the subscriber terminal 1N, the following operation will be performed to connect subscriber terminals 1 and 1N.

The control processor 130 makes an inquiry about an idle time slot number available on both junctor highways HW10 and HW2N to the control processor 230. The control processor 230 searches an idle time slot available on both junctor highways HW10 and HW1N, and then selects one of available time slot number and notifies this information to the control processor 130. The control processor 130 instructs the time switch 110 to perform a time slot exchange operation from an incoming time slot to the time slot which has been informed by the control processor 230, also, the control processor 130 instructs the control processor 230 and the control processor 13N to perform path establishment in the space switch 21N and in the time switch 12N respectively. In the space switch 21N, the time slot which has been reserved on the junctor highway HW10 is switched to the same time slot on the junctor highway HW2N, and also, in the time switch 12N, a time slot exchange operation from the time slot on the junctor highway HW2N which is connected to the time switch 12N via the selecting circuit 14N, informed by the control processor 130, to the time slot on the outgoing highway corresponding to the subscriber terminal 1N is performed.

However, when it is confirmed that the space switch module is a malfunction state (step 302: yes), the destination of the call is confirmed whether the destination of the call is within the same time switch module or not (step 303). If the destination is in the other time switch module (step 303: no), it means that no path is available due to space switch module failure, and the call process is interrupted and the call is rejected (step 306) as the result.

If the destination is in the same time switch module, assuming that it is the subscriber terminal 10, (step 303: yes), it means that communication path is still available via the third stage time switch 120, and the call process by the control processor 130 is proceeded by connecting incoming highway from the line circuit 310 to the input of the time switch 120 via the selecting circuit 140.

As the control processor 130 has both of time slot number information of the subscriber terminals 1 and 10, the control processor 130 instructs the time switch 120 to exchange a time slot on the incoming highway from the line circuit 310 to a time slot on the outgoing highway to the line circuit 320. Then, the communication path between subscriber terminals 1 and 10 has been completed.

As a consequence, each of the time switch modules 100–10N is solely operated as the T1-staged switch, so that the connections between the subscriber terminals accommodated in the same time switch module are guaranteed even if the space switch module becomes failure.

In the case that the failure in the space switch module 200 has been recovered, the control processors 130–13N of the time switch modules 100–10N, and also the control processor 230 of the space switch module 200 mutually perform the matching operations in order that the switching network again constitute the T-S-T 3-staged structure. At this time, each control processor 130–13N controls the corresponding selecting circuit 140–14N so as to connect the junctor highway HW20–HW2N from the space switch module 200 instead of the incoming highway from the line circuit 310–32N, so that the normal switching network structure is restored.

Figure 2:
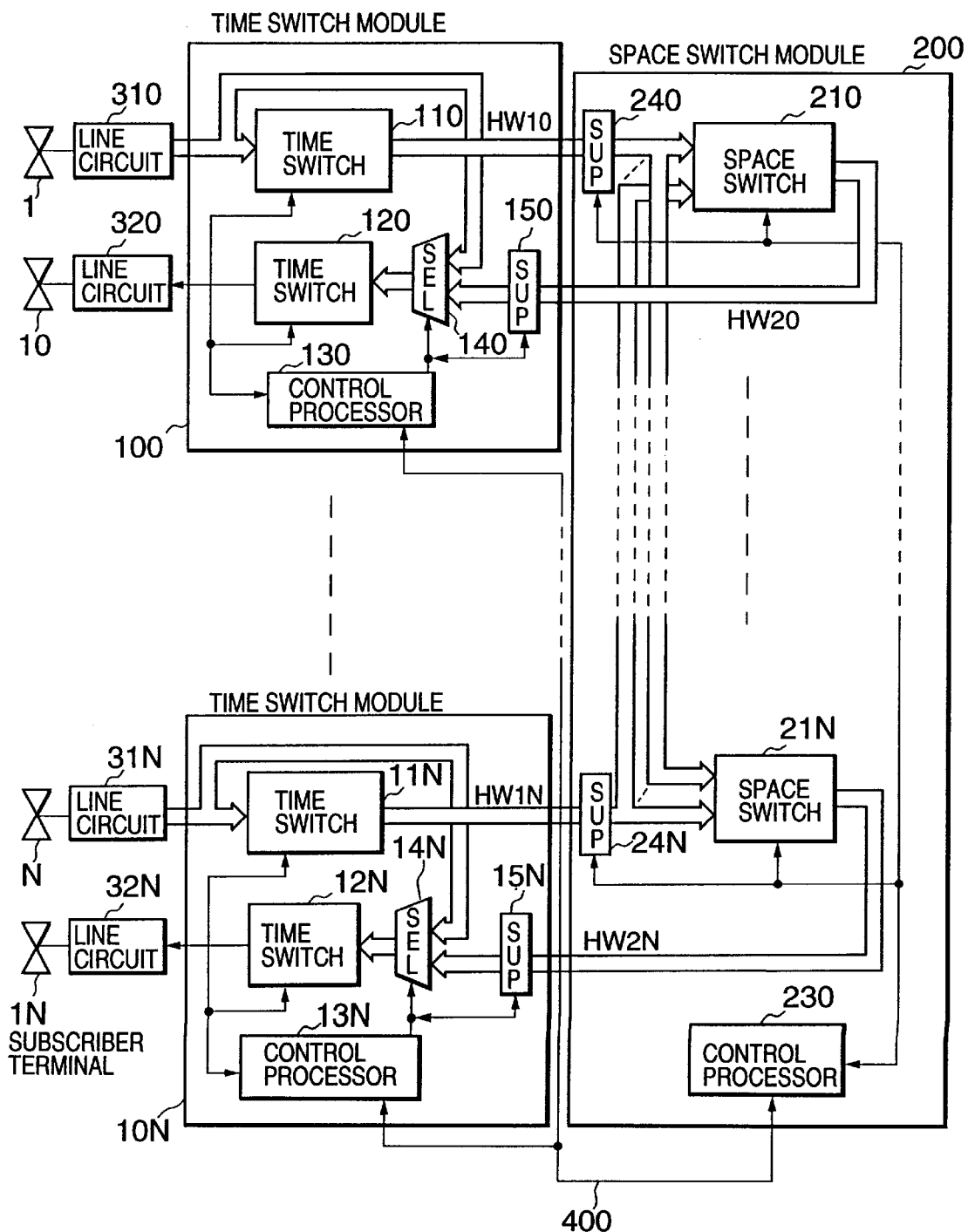
FIG. 2 is a block diagram illustrating a configuration of a second embodiment of the present invention.

FIG. 2 is a block diagram showing a configuration of a second embodiment of the present invention. The same reference numerals shown in FIG. 1 will be employed as those for indicating the same, or similar functional elements in FIG. 2.

Referring now to FIG. 2, in addition to the above-described first embodiment indicated in FIG. 1, in accordance with this embodiment, there are provided incoming junctor highway supervisory circuits 240–24N and outgoing junctor highway supervisory circuits 150–15N. These supervisory circuits supervises respectively a state of each of junctor highways HW10–HW1N which are incoming junctor highways for the space switch module 200, and junctor highways HW20–HW2N which are outgoing junctor highways for the spaces switch module 200.

Each of control processors 130–13n periodically receives result of supervision by the corresponding supervisory circuit 150–15N, and the control processor 230 periodically receives result of supervision by each of supervisory circuits 240–24N. If none of supervisory result has been received within a predetermined time, or a fault state has been reported by a supervisory circuit, it is detected as a fault state of the corresponding junctor highway. Also, the control processors 130–13n and the control processor 230 mutually confirm through the processor bus 400 as to whether or not each of the control processors are operated under normal conditions.

When a fault state is detected in any of supervisory circuits 240–24N by the control processor 230, this fault state is reported to all control processors 130–13N through the processor bus 400. Then, if a failure was detected in the supervisory circuit 240, it means that the junctor highway HW10 cannot be used for path establishment, the control processor 130 in the time switch module 100 which is corresponding to the fault junctor highway HW10 instructs the selection circuit 140 to select incoming highway from the line circuit 310 instead of the junctor highway HW20 from the space switch module 200 for relieving internal communication within the same time switch module. In this case, however, control processors in the time switch modules other than the control processor 130 do not perform any special operations, and maintains a T-S-T 3-staged switching network configuration because a failure of the junctor highway HW10 does not affect to any of time switch modules other than the time switch module 100.

When a fault state is detected in any of supervisory circuits 150–15N by the corresponding control processor 130–13N, this fault state is reported to control processors in other time switch modules through the processor bus 400. Then, if a failure was detected in the supervisory circuit 150, it means that the junctor highway HW20 cannot be used for path establishment, the control processor 130 in the time switch module 100 which is corresponding to the fault junctor highway HW20 instructs the selection circuit 140 to select incoming highway from the line circuit 310 instead of the junctor highway HW20 from the space switch module 200 only for internal communication within the same time switch module. That is, as the fault junctor highway HW20 does not affect to an operation for communication path establishment from a subscriber terminal in the time switch module 100 to a subscriber terminal in other time switch module, the control processor 130 performs normal operation by using a T-S-T 3-staged switching network configuration, but the fault junctor highway HW20 affects to a call within the same module, the control processor 130 performs a switching operation for such a call using a T one-stage switching network configuration.

In this case, control processor in the time switch module other than the control processor 130 performs the control operation that it rejects a call requiring communication path establishment for which the time switch module 100 is involved, but it performs normal control operation using a T-S-T 3-staged switching network as far as the call does not involve the time switch module 100.

Figure 4:
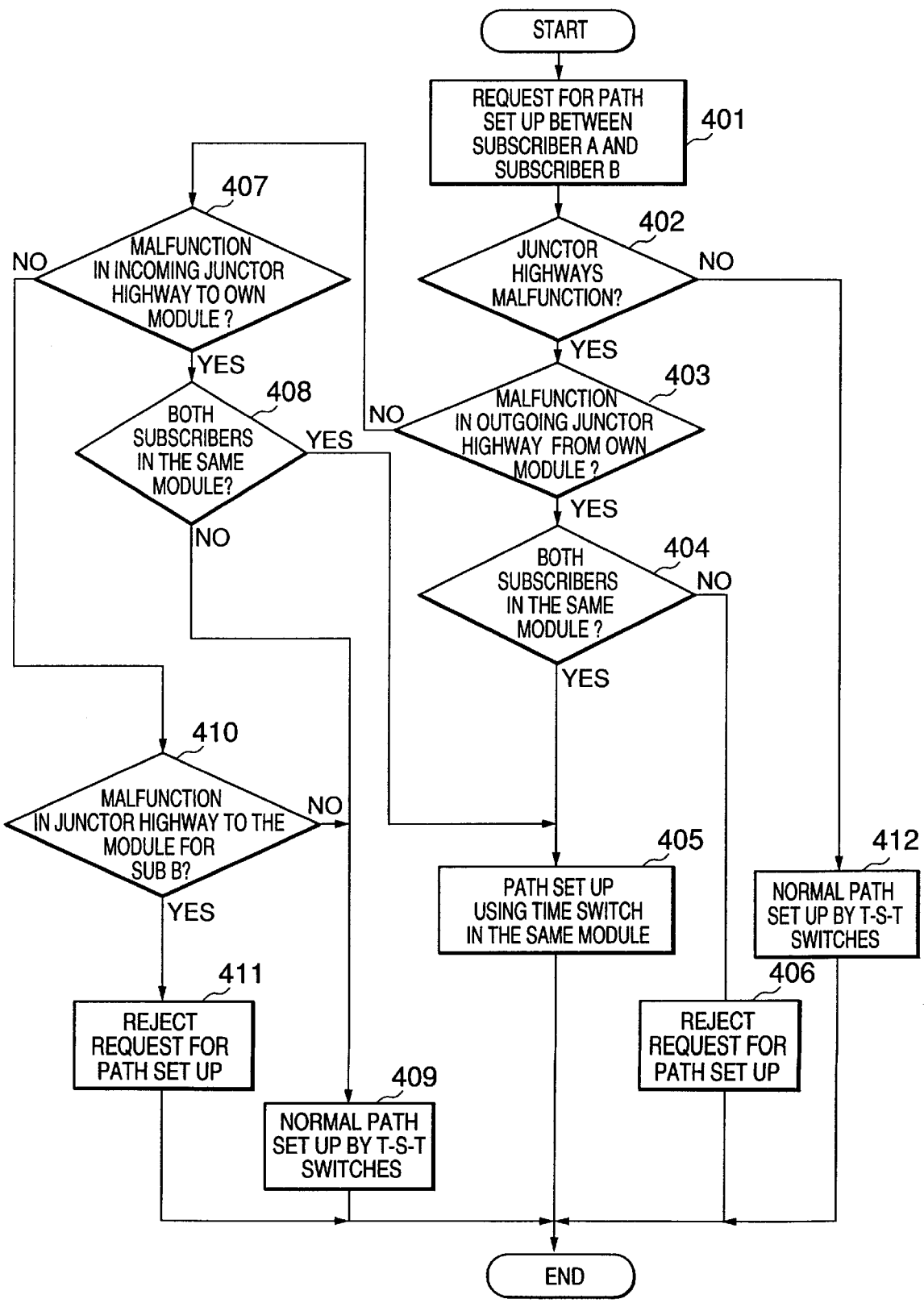
FIG. 4 is a flow chart explaining an operation of the second embodiment of the present invention.
Figure 5:
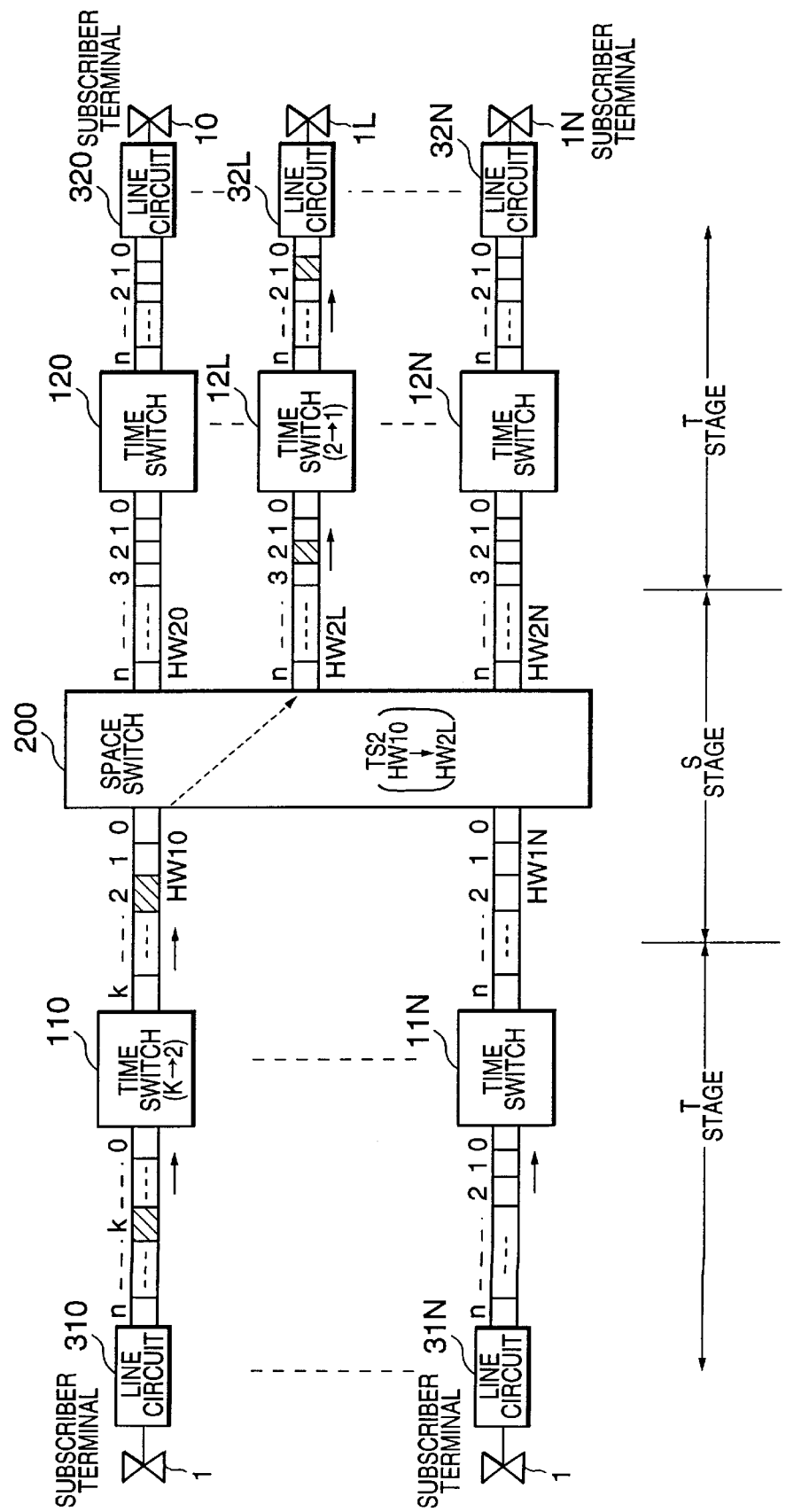
FIG. 5 is a block diagram illustrating the principle of time slot switching by a T-S-T 3-staged structure switching network.

FIG. 4 summarizes the foregoing operations.

Also, in such a case that a failure happens to occur in the control processor 230, since the control processors 130–13N cannot mutually confirm the normal characteristics thereof, each control processor 130–13N can discriminates that the failure occurs in the control processor 230. Similarly, in this case, the respective control processors 130–13N control the selecting circuits 140–14N in the own time switch module, so that each of these selecting circuits may be operated as a T one-staged switching network.

When the failure is recovered, the recovery information is obtained, and then control processors perform the ordinary T-S-T 3-staged switching network structure operation.

In the above-described embodiment, the T one-staged switching network configuration is used for relieving internal communication in the same time switch module. Alternatively, even in such a system that the T-T 2-staged switching network configuration which connects the junctor highway from the first stage time switch to the selecting circuit may be achieved.

As previously explained, in accordance with the present invention, even when the failure happens to occur in the space switch module in the T-S-T 3-staged structure switching network, the internal communication within the same time switch module can be made in unit of the T one-staged switching network.

Although the present invention has been fully described by way of the preferred embodiments thereof with reference to the accompanying drawings, various changes and modifications will be apparent to those having skill in this field. Therefore, unless these changes and modifications otherwise depart from the scope of the present invention, they should be construed as included therein.

What is claimed is:

1. A control system of a 3-staged time-division switch, constituted by a space switch module including a plurality of second stage space switches and a plurality of time switch modules, each including a first stage time switch coupled with one of said second stage space switches by a junctor highway and a third stage time switch coupled with one of said second stage space switches by another junctor highway, for forming a T-S-T (time switch-space switch-time switch) 3-staged structure switching network used in a multi-processor type digital switching system, said control system comprising:

a control means provided in each time switch module for connecting a highway coupled with an input of said first stage time switch, instead of said junctor highway coupled with one of said second stage space switches, to the input of said third stage time switch for constituting a one-staged time switch switching network when detecting said space switch module being in a faulty condition.

2. A control system of a 3-staged time-division switch, constituted by a space switch module including a plurality of second stage space switches and a plurality of time switch modules, each including a first stage time switch coupled with one of said second stage space switches by a junctor highway and a third stage time switch coupled with one of said second stage space switches by another junctor highway, for forming a T-S-T (time switch-space switch-time switch) 3-staged structure switching network used in a multi-processor type digital switching system, said control system comprising:

a control means provided in each time switch module for connecting a highway coupled with an input of said first stage time switch, instead of said junctor highway coupled with one of said second stage space switches, to the input of said third stage time switch for constituting a one-staged time switch switching network when detecting said junctor highway coupling between said first stage time switch and one of said second stage space switches being in a faulty condition.

3. A control system of a 3-staged time-division switch, constituted by a space switch module including a plurality of second stage space switches and a plurality of time switch modules, each including a first stage time switch coupled with one of said second stage space switches by a junctor highway and a third stage time switch coupled with one of said second stage space switches by another junctor highway, for forming a T-S-T (time switch-space switch-time switch) 3-staged structure switching network used in a multi-processor type digital switching system, said control system comprising:

a control means provided in each time switch module for selectively connecting said junctor highway coupled with one of said second stage space switches or a highway coupled with an input of said first stage time switch to the input of said third stage time switch in accordance with a state of said space switch module, and for constituting a one-staged time switch switching network by connecting the highway coupled with the input of said first stage time switch to the input of said third stage time switch when detecting said space switch module being in a faulty condition.

4. A control system of a 3-staged time-division switch, constituted by a space switch module including a plurality of second stage space switches and a plurality of time switch modules, each including a first stage time switch coupled with one of said second stage space switches by a junctor highway and a third stage time switch coupled with one of said second stage space switches by another junctor highway, for forming a T-S-T (time switch-space switch-time switch) 3-staged structure switching network used in a multi-processor type digital switching system, said control system comprising:

a control means provided in each time switch module for selectively connecting said junctor highway coupled with one of said second stage space switches or a highway coupled with an input of said first stage time switch to the input of said third stage time switch in accordance with a state of said junctor highway coupling between said first stage time switch and one of said second stage space switches, and for constituting a one-staged time switch switching network by connecting the highway coupled with the input of said first stage time switch to the input of said third stage time switch when detecting said junctor highway coupling between said first stage time switch and one of said second stage space switches being in a faulty condition.

5. A control system of a 3-staged time-division switch, constituted by a space switch module including a plurality of second stage space switches and a plurality of time switch modules, each including a first stage time switch coupled with one of said second stage space switches by a junctor highway and a third stage time switch coupled with one of said second stage space switches by another high way, for forming a T-S-T (time switch-space switch-time switch) 3-staged structure switching network used in a multi-processor type digital switching system, said control system comprising:

a selecting circuit in each time switch module provided in front of an input of said third stage time switch for selectively connecting said junctor highway coupled with one of said second stage space switches or a highway coupled with an input of said first stage time switch to the input of said third stage time switch; and a control processor in each time switch module for controlling said selecting circuit to connect the highway coupled with the input of said first stage time switch to the input of said third stage time switch when detecting said space switch module being in a faulty condition.

6. A control system of a 3-staged time-division switch, constituted by a space switch module including a plurality of second stage space switches and a plurality of time switch modules, each including a first stage time switch coupled with one of said second stage space switches by a junctor highway and a third stage time switch coupled with one of said second stage space switches by another junctor high way, for forming a T-S-T (time switch-space switch-time switch) 3-staged structure switching network used in a multi-processor type digital switching system, said control system comprising:

a selecting circuit in each time switch module provided in front of an input of said third time switch for selectively connecting said junctor highway coupled with one of said second stage space switches or a highway coupled with an input of said first stage time switch to the input of said third stage time switch; and a control processor in each time switch module for controlling said selecting circuit to connect the highway coupled with the input of said first stage time switch to the input of said third stage time switch when detecting said junctor highway coupling between said first stage time switch and one of said second stage space switches being in a faulty condition.

7. A control system of a 3-staged time-division switch constituted by a T-S-T (time switch-space switch-time switch) 3-staged structure switching network used in a multi-processor type digital switching system, said control system comprising:

a space switch module including a plurality of second stage space switches; and a plurality of time switch modules, each including a first stage time switch whose output being coupled with an input of one of said second stage space switches, a third stage time switch whose input being coupled with a selecting circuit for selectively connecting a junctor highway coupled with an output of one of said second stage space switches or a highway coupled with an input of said first stage time switch, and a control processor for controlling said selecting circuit to connect the highway coupled with the input of said first stage time switch to the input of said third stage time switch when detecting said space switch module being in a faulty condition.

8. A control system of a 3-staged time-division switch according to claim 7, said control system further comprising:

a supervisory circuit for supervising a state of said junctor highway coupling between said first stage time switch and one of said second stage space switches, and a control processor for detecting a state of said junctor highway through said supervisory circuit in said space switch module; wherein, said control processor in said time switch module controlling said selecting circuit to connect the highway coupled with the input of said first stage time switch to the input of said third stage time switch when detecting a faulty condition of said junctor highway coupling between said first stage time switch and one of said second stage space switches by information sent from said control processor in said space switch module through a processor bus.

9. A control system of a 3-staged time-division switch according to claim 8, wherein, said control processor in said space switch module distributing a faulty condition of said junctor highway between said first time switch and said second space switch to all control processors in said time switch modules through said processor bus, and each of said control processors in said time switch modules maintaining said T-S-T 3-staged structure switching network unless otherwise said junctor highway under faulty condition being connected to own time switch module.

10. A control system of a 3-staged time-division switch according to claim 7, each time switch module further comprising:

a supervisory circuit for supervising a state of said junctor highway coupling between said selecting circuit and one of said second stage space switches;

wherein, said control processor in said time switch module controlling said selecting circuit to connect the highway coupled with the input of said first stage time switch to the input of said third stage time switch for intra time switch module calls when detecting a faulty condition of said junctor highway coupling between said selecting circuit and one of said second stage space switches, and distributing information of said faulty condition of said junctor highway to other control processors in other time switch modules through a processor bus.

* * * * *